UNITED STATES PATENT OFFICE.

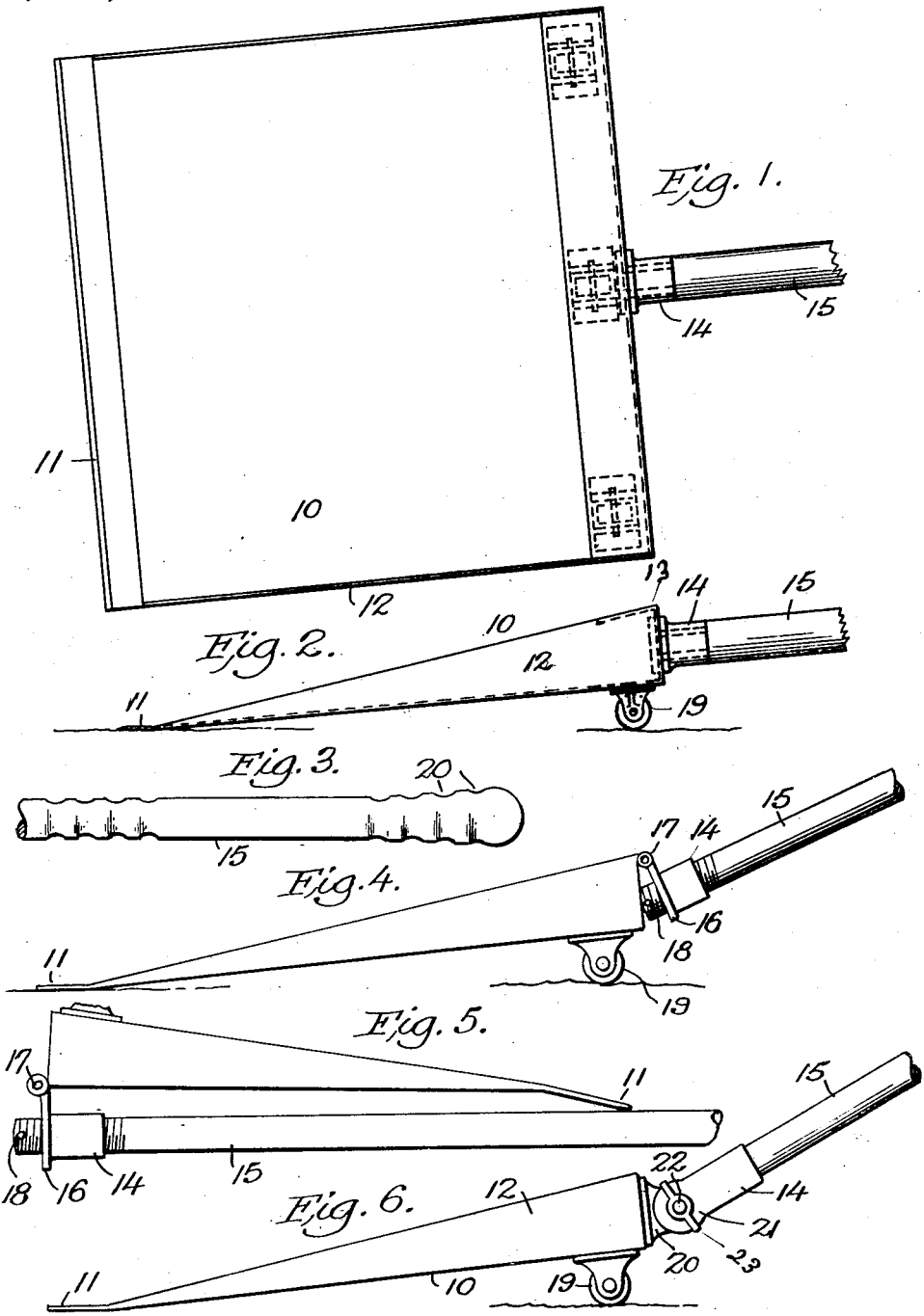

HENRY L. SPERLING, OF NEW YORK, N. Y.

DUSTPAN.

1,355,577.

Specification of Letters Patent.

Patented Oct. 12, 1920.

Application filed October 13, 1919. Serial No. 330,444.

*To all whom it may concern:*

Be it known that I, HENRY L. SPERLING, a citizen of the United States, residing at New York, Bronx county, New York State, have invented certain new and useful Improvements in Dustpans, of which the following is a specification.

This invention relates to dust pans and more especially to the larger variety used in street sweeping and its object is to mount the pan on rollers and provide an adjustable handle to raise or lower the edge of the pan and prevent its continual scraping on the pavement when not collecting dust and dirt and which adjustment also permits of the folding of the pan on said handle to decrease its length for transportation.

These and other objects and details of the invention are more fully described in the following specification, set forth in the appended claims, and illustrated in the accompanying drawings, wherein:

Figure 1 is a plan view of the improved dust pan,

Fig. 2 is a side view of the same,

Fig. 3 is a detail view of the upper end of the handle,

Fig. 4 is a side view of the pan showing the manner for adjusting the angle of the handle, Fig. 5 is a side view of the pan folded on the handle, Fig. 6 shows a modified means for adjusting the handle.

Considerable wear and tear follows the constant scraping of a dust pan on the city streets so that the life of same when in continual use is only a few days or a week, while the actual work to be performed is often very little. In the transportation and storing of these pans in quantities, it is desirable that they be packed together and occupy as little space as possible, and lastly that means is provided to adjust the handle to the height of the operator so that the edge of the pan may always be kept off the ground when not in use and its weight be put upon rollers entirely.

The pan 10, is preferably rectangular in shape and has the front edge or blade 11, of hardened metal, or it may be a reinforcing of the sheet metal bottom. The sides 12, slope toward the front and the back side 13, carries a socket 14, for the handle 15. While the socket 14, may be secured to the back 13 permanently, the preferred method of attaching the same is to so pivot same that the angle of the handle may be varied and in Fig. 4, the socket is part of a hinged plate 16, pivoted to the back at 17, and adapted to swing on that point. The lower end of the handle 15, is threaded and plays in or out of the socket and bears upon the back side of the pan and as it moves in or out of the socket, it is apparent that the angle of the plate 16, and the handle are altered, but the handle may be held against removal by a pin 18. By thus adjusting the handle, its height may be regulated to the length of the operator's arm at its outer end and be made just so high that when he pushes or draws the pan over the pavement, the blade 11, is off the ground and no wear results, but by slightly raising the handle, the blade is forced against the ground.

The fulcrum and the anti-friction means in this instance are the rollers 19, journaled on the lower face of the pan and near the rear edges and the handle may be of sufficient weight to just counter balance the pan and tend to keep it off the ground. The outer end of the handle 15, may be encircled with grooves arranged in two groups to be grasped by the hands of the operator and assist in his work.

When there is no desire to operate the pan, it may be folded back on the handle, as shown in Fig. 5, and the latter carried on the shoulder of the operator.

Another means for adjusting the handle, is to provide the back of the pan with a friction plate 20, as shown in Fig. 6, and fit the socket 14, with a similar disk 21, both being pierced by a bolt 22, carrying the wing nut 23, to force the friction faces into contact and lock the handle at any desired angle.

It is obvious that other modifications and arrangements may be resorted to without departing from the essential features above described or from the scope of the appended claims.

What I claim as new is:

1. In a dust pan, the combination of a pan having a blade at its front end and mounted on rollers, a hinged plate at the rear of the pan, a threaded sleeve on the plate, and a handle with threads for the sleeve and whose end is adapted to bear against the back of the pan when adjusted in said sleeve.

2. In a dust pan, the combination of a pan, a sleeve with internal threads and hinged to the back of the pan, and a handle with threads and adapted to play in the sleeve and impinge the back of the pan to change its angle with relation to said pan.

In testimony whereof, I have signed my name to this specification in the presence of two subscribing witnesses, this 20th day of September, 1919.

HENRY L. SPERLING.

Witnesses:
 JAMES F. DUHAMEL,
 ALFRED S. MALCONESON.